United States Patent

Horn et al.

[11] Patent Number: 6,012,880
[45] Date of Patent: Jan. 11, 2000

[54] DEVICE FOR FINISH MACHINING OF BEARING BORES AT CRANKCASES

[75] Inventors: Wolfgang Horn, Pleidelsheim; Armin Wunderlich, Mundelsheim; Klaus Faber, Ludwigsburg, all of Germany

[73] Assignee: Hüller Hille GmbH, Germany

[21] Appl. No.: 09/203,933

[22] Filed: Dec. 2, 1998

[30] Foreign Application Priority Data

Dec. 20, 1997 [DE] Germany .................. 197 56 993

[51] Int. Cl.[7] ................................. B23B 41/12
[52] U.S. Cl. ................ 408/156; 408/158; 408/708
[58] Field of Search ............... 408/16, 153, 154, 408/156, 159, 172, 708, 158; 409/236

[56] References Cited

U.S. PATENT DOCUMENTS

| | | | |
|---|---|---|---|
| 3,530,744 | 9/1970 | Jacobson | 408/186 |
| 4,224,846 | 9/1980 | Eysel et al. | 408/147 |
| 4,676,127 | 6/1987 | Watanabe | 408/16 |
| 4,995,160 | 2/1991 | Schmid | 409/236 |
| 5,174,695 | 12/1992 | Bathen et al. | 408/159 |
| 5,251,511 | 10/1993 | Muendlein et al. | 408/16 |

FOREIGN PATENT DOCUMENTS

| | | |
|---|---|---|
| 0 169 973 A1 | 2/1986 | European Pat. Off. . |
| 42 14 505 A1 | 11/1993 | Germany . |
| 43 03 526 C2 | 8/1994 | Germany . |
| 33210 | 4/1981 | Japan ................ 408/708 |
| WO 98/41349 | 9/1998 | WIPO . |

*Primary Examiner*—Daniel W. Howell
*Attorney, Agent, or Firm*—McGlew and Tuttle, P.C.

[57] ABSTRACT

A precise finish machining of bearing bores (25) at crankcases (26) is made feasible by way of a device with tow skid-guided spindle boxes (1, 2), the drivable spindles of which are in flush alignment. One spindle is designed as a working spindle (3) carrying a radially adjustable tool (11), while the other spindle is designed as a guide spindle (4) engaging with a guide pin (6) into a front-end bore (5) of the working spindle (3). The guide pin (6) is succeeded by a cone (7) on which the adjustable tool (11) is supported, and where a measuring key (14) is located between the cone (7) and the base (12) of the bore (5), the measuring signal from said measuring key serving for control of the distance between both spindle boxes (1, 2) and thus for control of the radial excursion of the tool (11).

20 Claims, 2 Drawing Sheets

DEVICE FOR FINISH MACHINING OF BEARING BORES AT CRANKCASES

FIELD AND BACKGROUND OF THE INVENTION

A finish machining of bearing bores at crankcases in practice is effected by the aid of a device (boring mill) equipped with a unique spindle at the end of which a tool is affixed. The spindle must be adequately long particularly for crankcases with a multitude of bearing bores. In the process the reaction forces occurring between the tool an the work piece may lead to uncontrollable deformation of the spindle. Additionally the adjustment and/or re-adjustment of the tool is difficult. All of this may lead to negative effects on the operation result.

SUMMARY AND OBJECTS OF THE INVENTION

It is the primary object of this invention to provide a device to allow for a precise finish machining of the bearing bores at crankcases.

This task is solved with a device for finish machining of bearing bores at crankcases with two skid-guided spindle boxes, the drivable spindles of which are in flush alignment, whereof one spindle is designed as working spindle carrying a radial tool, while the other spindle is designed as guide spindle engaging with one guide pin into a front-end bore of the working spindle, and where the guide pin is succeeded by a cone on which the adjustable tool is supported. Preferably arranged between the cone and the base of the bore is a measuring key, the measuring signal of which serves for control of the distance between both spindle boxes and thus for control of the radial excursion of the tool. With this device the reaction forces occurring between the tool and the work piece are not only absorbed by the working spindle but also by the guide spindle, so that any potential deformation will be reduced to a minimum. At the same time the radial adjustment of the tool is simplified because the distance between both spindle boxes and thus the radial excursion and/or adjustment of the tool is controlled or regulated with the measuring signal of the measuring key.

The tool is preferably affixed to a resilient tool holder which on the one hand is affixed to the working spindle and on the other hand is supported on the cone. The resilient arrangement of the tool holder and thus that of the tool at the cone ensures that the tool holder and/or the tool will constantly take the desired position.

Other tools for a semi-finish machining may be affixed to the working spindle.

In a preferred layout the guide spindle is equipped with a measuring device provided with at least one measuring mandrel guided in a radial bore so that it is possible to control the relevant operation result directly.

To this effect the measuring mandrel can be supported on a cone or wedge which is slidable in a longitudinal bore of the guide spindle, and a measuring key can be provided to record and pick-up the position of the cone or wedge. Expediently the longitudinal bore proceeds from the front-end of the guide spindle facing the working spindle side, closing it with a lid carrying the guide pin. The cone or wedge is slidable by the aid of a positioner drive in the longitudinal bore, preferably with a stroke cylinder accommodated in the longitudinal bore. The measuring key may then be arranged between the lid and the face front-end of the cone or wedge.

Preferably both the measuring key belonging to the working spindle and the measuring key belonging to the guide spindle are designed as inductive measuring keys. Transmission of the measuring signals emitted from the measuring keys can be effected by infra-red data transmission.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
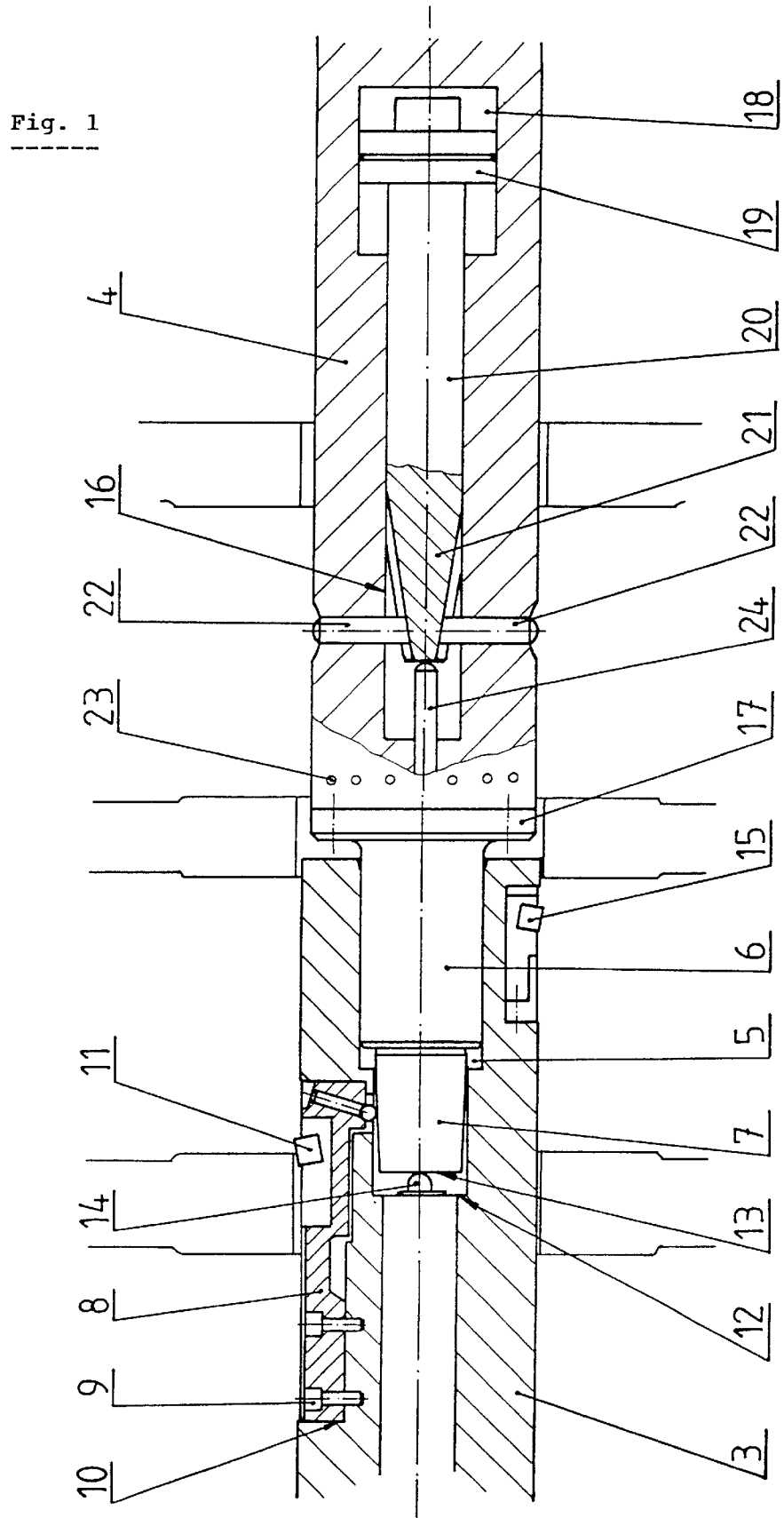
FIG. 1 is a schematic partially vertical sectional view taken through a device for finish machining of bearing boxes at crankcases.

Referring to the drawings in particular, FIG. 1 shows two spindle boxes 1, 2. The spindle boxes 1 and 2 are guided at a skid arranged opposite to each other, not shown in FIG. 1. The spindle boxes 1, 2 are equipped with drives not shown here by means of which they can be moved along the skid. Supported in each spindle box 1 and/or 2 is one drivable spindle each, whereof one spindle is designed as working spindle 3 and the other spindle is designed as guide spindle 4.

Figure 2:
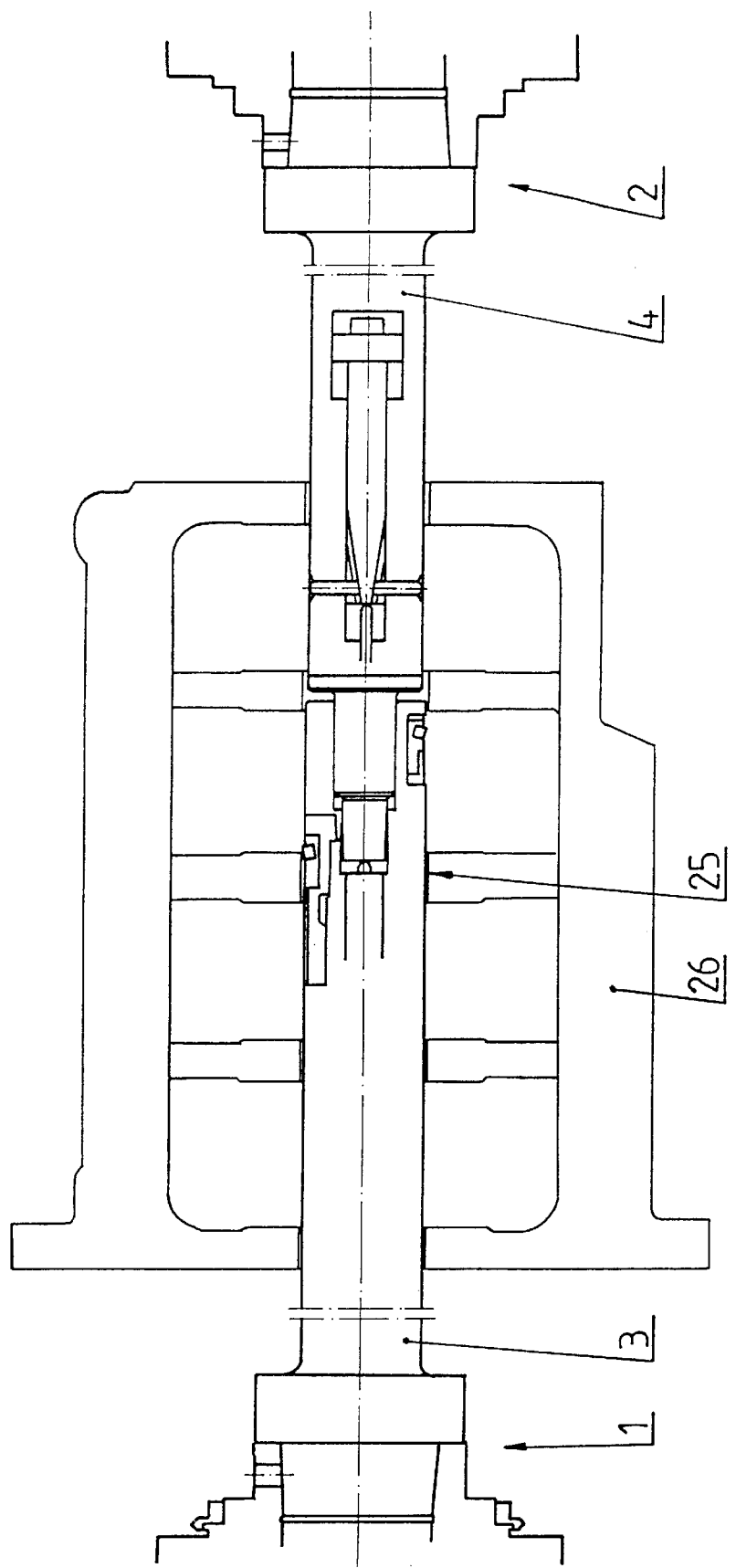
FIG. 2 is an enhanced section for FIG. 1.

Pursuant to FIG. 2 the working spindle 3 has got a stepped bore 5 proceeding from its free front-end, in the section of which with a greater diameter a guide pin 6 is laid which succeeds to the front-end of the guide spindle 4. A cone 7 extending from the guide pin 6 engages into the section with the smaller diameter of the stepped bore 5, the cone possessing a cone angle of approx. 1.5' in the layout shown bore.

Supported on cone 7 is the free end of a resilient tool holder 8, with the other end of the tool holder being fastened with a screw fixing 9 in a circumferential recess 10 of working spindle 3. Tool holder 8 carries a tool 11.

Located between base 12 of stepped bore 5 and free front-end 13 of cone 7 is an inductive measuring key 14, the measuring signals of which are transmitted via an infra-red data transmission to the control of the drives for movement of spindle boxes 1, 2 on the skid.

Arranged at the circumference of working spindle 3 with axial distance to the tool 11 is at least a semi-finish tool 15. The guide spindle 4 is provided with a longitudinal bore 16 proceeding from its free steering side, the longitudinal bore being closed at the front side with a lid 17. This lid 17 carries the guide pin 6 with cone 7. The other end of the longitudinal bore 16 is extended so that a working space 18 is created for a piston slidable at it. A piston rod 20 succeeding piston 19 passes over into a cone 21 on which measuring mandrels 22 lying radially opposite to each other and guided in radial bores are supported as shown on layout 2.

The measuring mandrels are provided with blow nozzles indicatively shown by arrows 23. Fluid lines for supply of fluid to working space 18 and blow nozzles are not illustrated here. Located between lid 17 and the free-front end of cone or wedge 21 is an inductive measuring key 24, the measuring signals of which are also transmitted by way of inductive data transmission.

The device shown here works as follows: after a semi-finish machining, the tool 11 is moved by a controlled movement of spindle boxes 1 and 2 into the area of a bearing bore 25 of crankcase 26.

The radial excursion of tool 11 is adjusted by a variation of the reciprocal distance of both spindle boxes 1 and 2.

Then the finish machining can be carded out. Upon completion of the finish machining, the two spindle boxes 1 and 2 are traversed so much that the measuring mandrels 22 reach into the area of the machined bearing bore 25. The fluid leaving from the blow nozzles cleans the machined surface. Because of the charge of fluid to piston 19 the measuring mandrels 22 are extended until they rest against the machined surface. The measuring key 24 picks-up this position. The finish machining is repeated or finalized depending on the measuring result.

While a specific embodiment of the invention has been shown and described in detail to illustrate the application of the principles of the invention, it will be understood that the invention may be embodied otherwise without departing from such principles.

What is claimed is:

1. A device for finish machining of bearing bores at crankcases, the device comprising:
    a movably guided spindle box;
    another movably guided spindle box;
    a drivable spindle supported in said spindle box;
    another drivable spindle supported in said another spindle box, said drivable spindle being in flush alignment with said another drivable spindle, wherein one spindle is designed as working spindle and the other spindle is designed as guide spindle engaging with one guide pin into a front-end bore of the working spindle, said guide spindle having a cone extending to said guide pin; and
    an adjustable tool resting on said cone.

2. The device according to claim 1, wherein between said cone and a base of said bore a measuring key is arranged, a measuring signal of said measuring key serving for control of a distance between both spindle boxes and thus for control of a radial excursion of said tool.

3. The device according to claim 1, wherein said tool is affixed to a resilient tool holder which is affixed to the working spindle and is supported on said cone.

4. The device according to claim 1, wherein at least one tool for semi-finish machining is affixed to said working spindle.

5. The device according to claims 1, wherein said guide spindle is equipped with a measuring device provided which at least one measuring mandrel guided in a radial bore.

6. The device according to claim 5, wherein said measuring mandrel rests supported on a cone or wedge slidable in a longitudinal bore of said guide spindle and a measuring key is provided for the pick-up of the position of said cone or wedge.

7. The device according to claims 6, wherein said longitudinal bore proceeds from said guide spindle front-end located at the working spindle and is closed with a lid carrying said guide pin.

8. The device according to claims 6, wherein said cone or wedge is slidable with a stroke cylinder accommodated in said longitudinal bore.

9. The device according to claim 7, wherein the measuring key is arranged between said lid and a free front-end of said cone or wedge.

10. The device according to any claim 2, wherein said measuring key is an inductive measuring key.

11. The device according to any claim 6, wherein said measuring key is an inductive measuring key.

12. The device according to claim 2, wherein said measuring key includes an infrared data transmission means for emitting measuring signals from said measuring key.

13. The device according to claim 6, wherein said measuring key includes an infrared data transmission means for emitting measuring signals from said measuring key.

14. A device for finish machining of bearing bores at crankcases, the device comprising:
    a movable spindle box;
    another movable spindle box;
    a working drivable spindle supported in said spindle box;
    a guide drivable spindle supported in said another spindle box, said working drivable spindle being in flush alignment with said guide drivable spindle, said working spindle engaging said guide spindle with a guide pin of said guide spindle engaging into a front-end bore of said working spindle, said guide spindle having a cone extending from said guide pin; and
    an adjustable tool resting on said cone.

15. The device according to claim 14, wherein:
    between said cone and a base said bore a measuring key is arranged, a measuring signal of said measuring key serving for control of a distance between both spindle boxes and thus for control of a radial excursion of said tool;
    said guide spindle is equipped with a measuring device provided which at least one measuring mandrel guided in a radial bore of said guide spindle; and
    said measuring mandrel rests supported on a cone or wedge slidable in a longitudinal bore of said guide spindle and another measuring key is provided for the pick-up of the position of said cone or wedge.

16. The device according to claim 14, wherein said tool is affixed to a resilient tool holder which is affixed to the working spindle and is supported on said cone.

17. The device according to claim 14, wherein at least one tool for semi-finish machining is affixed to said working spindle.

18. The device according to claims 15, wherein:
    said longitudinal bore proceeds from said guide spindle front-end located at the working spindle and is closed with a lid carrying said guide pin;
    said cone or wedge is slidable with a stroke cylinder accommodated in said longitudinal bore; and
    said another measuring key is arranged between said lid and a free front-end of said cone or wedge.

19. The device according to any claim 15, wherein said measuring key and said another measuring key are inductive measuring keys.

20. The device according to claim 15, wherein said measuring key includes an infrared data transmission means for emitting measuring signals from said measuring key.

* * * * *